June 20, 1933.    J. FYFE    1,914,851

HOSE SHUT-OFF AND CLAMP

Filed Aug. 8, 1932    2 Sheets-Sheet 1

INVENTOR
John Fyfe.

BY Albert F Dietrich
ATTORNEY

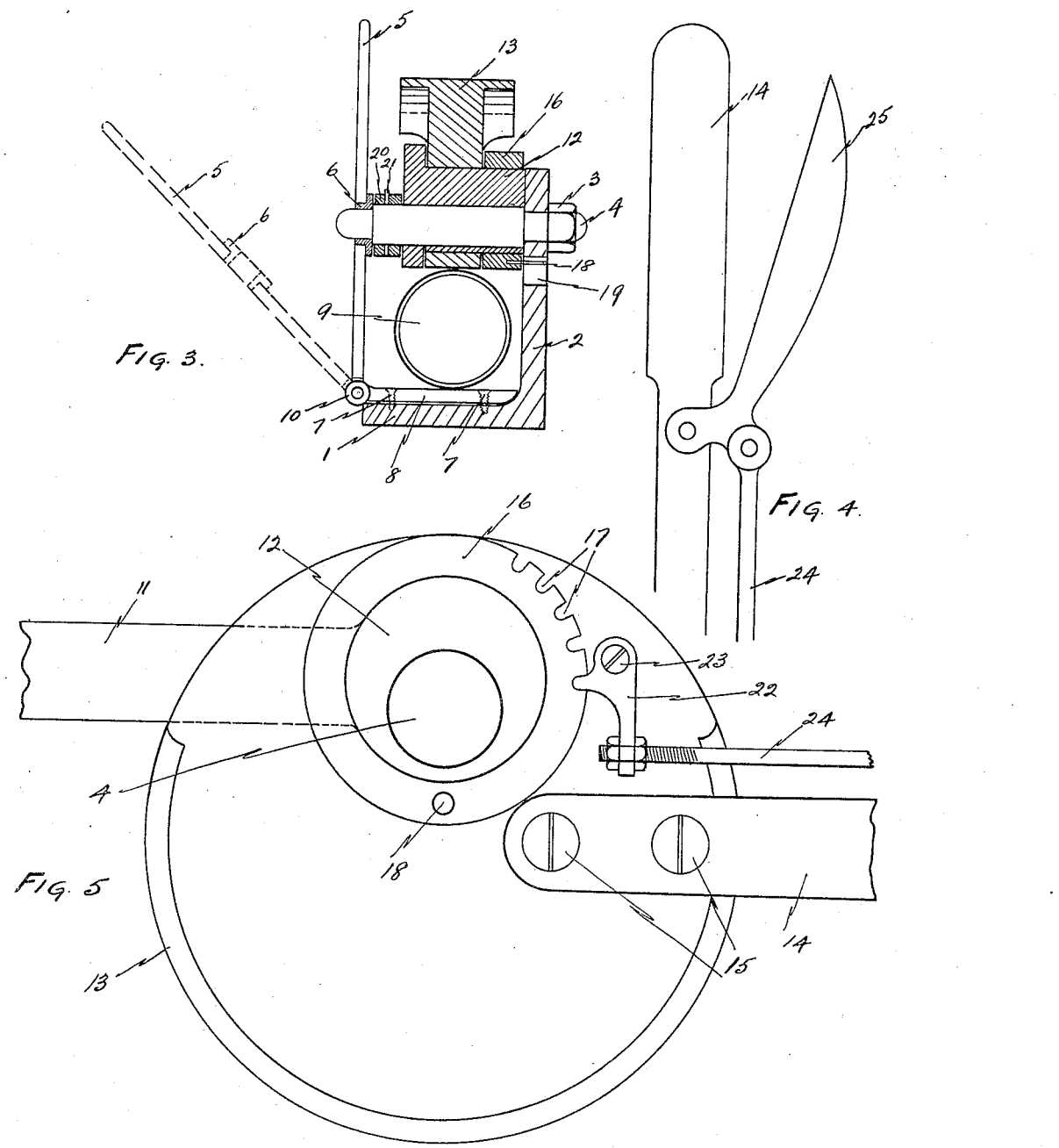

Patented June 20, 1933

1,914,851

UNITED STATES PATENT OFFICE

JOHN FYFE, OF VANCOUVER, BRITISH COLUMBIA, CANADA

HOSE SHUT-OFF AND CLAMP

Application filed August 8, 1932. Serial No. 627,951.

This invention relates to a hose shut-off device or clamp for shutting off the water flow in a hose line and is particularly applicable for use by fire departments wherein the necessity often arises to shut off a particular hose that is connected to a dual supply, without disturbing the flow in any other connected hose.

An object of my invention is to provide an efficient shut-off device that will operate without damage to the hose.

A further object of my invention is to provide an efficient and positive shut-off that is readily portable, easily applied and economical to construct.

A still further object of my invention is to provide a shut-off positive in action and when once applied will not fly open or require any other attention.

Still another object of my invention is to provide a shut-off that can be applied to any hose after it is laid and will operate to shut off against any pressure that the hose can stand, or can be adjusted to admit a partial flow through the hose.

My invention may be used with any type or size of hose and can be applied to hydraulic, oil or air hoses to shut off the supply therein.

By suitable modification of the main cam member and provision of an auxiliary bed plate my invention may be adapted to serve as an efficient and powerful cable clamp suitable for holding a cable for splicing, cutting or other work thereon.

My invention will be more readily understood by reference to the drawings accompanying and forming a part of this application and in which.

Figure 2:
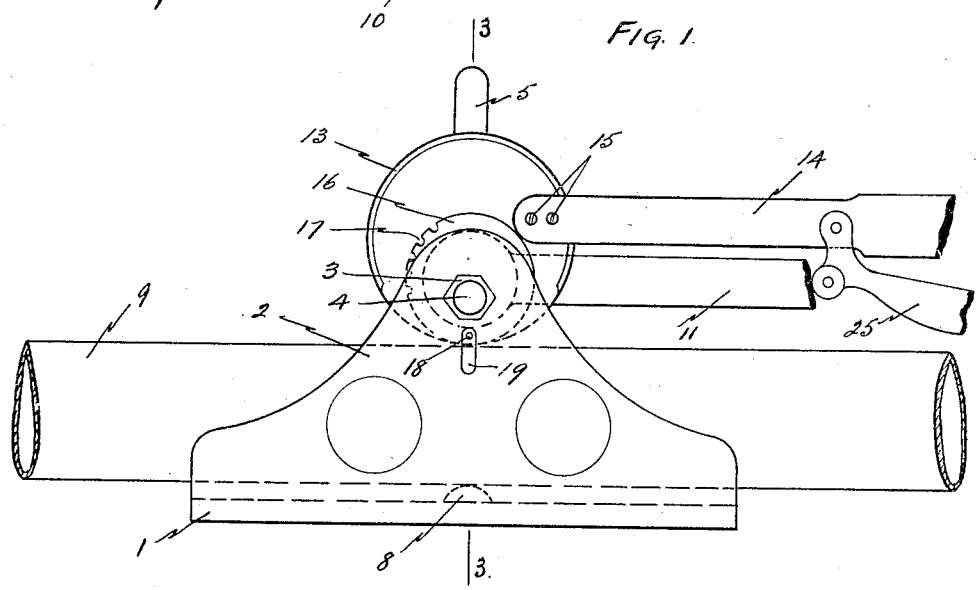
Figure 2 is a back elevation of the hose clamp and shows both eccentric levers in the high or raised position and illustrates the grooved collar and stationary pin therein and slot in back plate for the pin to slide therein, also shows piece of hose laid in clamp and the shouldered rib in the centre of the base plate. For purpose of clarity the pawl on the large cam has been omitted.

Figure 3 is a sectional view taken on the line 3—3 of Figure 2 and shows mounting of stub shaft in back plate, both cams in raised position and illustrating the mounting of the large cam and grooved collar on the eccentric boss of the small eccentric lever, also shows the pinned retaining collar on the outer end of stub shaft. A section of the hose is shown laid over the shouldered rib. The hinged supporting arm is indicated in dotted lines as partially open for inserting the hose under the clamp.

Figure 4 is a detail view of the handle mechanism for operating the cam pawl of the large eccentric.

Figure 5 is an enlarged view of the eccentric cam and grooved collar and cam pawl connected to the operating rod.

In these drawings like numerals indicate like parts and the numeral 1 indicates a rectangular base plate having an integral and vertical back plate 2 in which is secured by the nut 3 the short stub shaft 4, the outer end of which is of reduced diameter and is supported by the hinged arm 5 having the bearing bushing 6 secured therein.

Secured to the base plate 1 by the screws 7 is a semicircular rib 8 forming a shoulder over which the hose 9 is caused to lie when the clamp is applied thereto.

The member 8 is positioned immediately below the stub shaft 4 and in alignment therewith and has its outer end formed to comprise a hinge portion 10 to which is secured the end of the hinged arm 5.

Mounted on the stub shaft 4 is the lever 11 having an eccentric boss 12 formed integral therewith. Mounted upon the eccentric boss 12 is the eccentric cam lever 13 having the arm 14 secured thereto by the screws 15.

Upon the outside of the eccentric cam 13 and mounted upon the extending portion of the eccentric boss 12 is the collar 16 having the grooves or slots 17 cut on part of its peripheral face.

The collar 16 is prevented from turning or rotating on the eccentric boss 12 by the fixed pin 18 secured in the side of the collar and positioned in the slot 19 cut in the vertical side 2 of the base plate 1.

The slot 19 is of sufficient length to take care of the throw of the eccentric boss 12 and permits of the vertical movement of the collar 16 without rotation. The object in making the collar 16 stationary is so that the grooves or slots 17 will always be in correct position for adjusting the eccentric cam into a partially closed position when it is desired to do so.

On the outer end of the stub shaft 4 is secured the collar 20 held by the pin 21 to retain the eccentric levers on the shaft.

The assembly of the grooved collar 16 and large eccentric cam 13 upon the eccentric boss 12 is preferably made before mounting upon the stub shaft 4.

Secured on the side of the large eccentric cam 13 is the pawl 22 pivoted on the screw 23 and operated by the rod 24 connected to the hand grip 25 mounted upon the handle end of the lever arm 14.

The pawl 22 registers with the grooves or slots 17 cut into the peripheral face of the collar 16 and permits the large eccentric cam 13 to be positioned upon the eccentric boss 12 to partially collapse or shut off a hose to which the clamp may be applied. This is often necessary in fire work where hoses may be connected to a dual water supply and it is desired to retain full pressure in one hose and restrict the flow in the other.

In operation the clamp is applied to the hose by opening up the hinged supporting arm 5 and inserting the hose under the eccentric cam levers 11 and 13 and then closing the hinged arm 5 upon the end of the stub shaft 4. If it is now desired to partially shut off the flow in the hose to which the clamp is applied the lever arm 14 is raised and swung over from the position it is shown in Figure 2 to the position shown in Figure 1 and this effectively restricts the flow in the hose but does not entirely shut off the flow.

Figure 1:
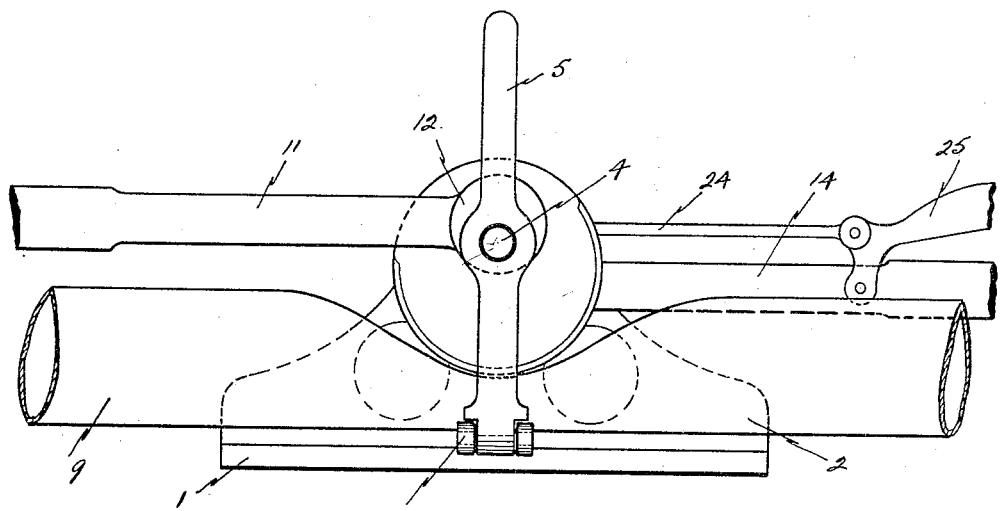
Figure 1 is a front elevation of the hose clamp showing a section of hose partially collapsed by the large eccentric cam being swung over into its lowermost position. This view shows the hinged supporting arm and small eccentric lever in the high position.

Of course it is obvious that the lever arm 14 may be positioned intermediate of the position shown in Figure 1 by adjusting it upon the grooved collar 16 through the pawl 22 to partially restrict the flow. If it is desired to completely shut off the flow in the hose the lever arm 14 and cam 13 are thrown over to the position shown in Figure 1 and then the lever 11 and eccentric 12 are swung over, thereby lowering the cam 13 upon the hose tightly compressing it upon the rib 8, thereby entirely collapsing the hose and shutting off all flow therein.

Having now described my invention what I claim and desire to be protected by Letters Patent, is:

1. In an adjustable hose shut-off and clamp the combination comprising, a rectangular base plate, a bearing support formed on one side thereof, a stub shaft secured in said bearing support, an eccentric boss lever mounted upon said stub shaft, an eccentric cam lever mounted upon the eccentric boss of first said lever, a transverse semicircular rib formed upon said base plate intermediate its ends, a hinge portion formed upon the outer end of said rib, a hinged bearing support arm connected to said hinge portion adapted to support the end of said stub shaft.

2. In an adjustable hose shut-off and clamp the combination comprising, a rectangular base plate, said base plate having a bearing support formed on one side thereof, a stub shaft comprising a bearing secured in said bearing support, an eccentric boss lever mounted upon said stub shaft, an eccentric cam lever mounted upon the eccentric boss of first said lever, a transverse semicircular rib formed upon said base plate intermediate its ends and in alignment with said stub shaft, a hinge portion formed upon the outer end of said rib, a hinged bearing support arm connected to said hinge portion adapted to support the end of said stub shaft.

3. In an adjustable hose shut-off and clamp the combination comprising, a rectangular base plate, said base plate having a bearing support formed on one side thereof, a stub shaft comprising a bearing secured in said bearing support, an eccentric boss lever mounted upon said stub shaft, an eccentric cam lever and collar mounted upon the eccentric boss of first said lever, slots cut upon the peripheral face of said collar, a hinged bearing support secured to said base plate adapted to support the outer end of said stub shaft, and means to position said eccentric cam upon its bearing whereby the hose may be only partially collapsed.

4. In an adjustable hose shut-off and clamp the combination comprising, a rectangular base plate, a bearing support formed on one side thereof, a stub shaft secured in said bearing support, means supporting the outer end of said stub shaft, an eccentric boss lever mounted upon said stub shaft, an eccentric cam lever and collar mounted upon the eccentric boss of first said lever, said collar having slots cut upon part of its peripheral face, a pawl mounted upon the side of said eccentric cam lever, a rod connected to said pawl and to a pivoted hand grip mounted upon the lever of said eccentric cam whereby on movement of said hand grip and lever the pawl may be operated and caused to register with the slots in said collar to position said eccentric cam upon its bearing.

5. In an adjustable hose shut-off and clamp the combination comprising, a rectangular base plate, a bearing support on one side thereof, a stub shaft secured in said bearing support, means supporting the outer end of said stub shaft, an eccentric boss lever mounted upon said stub shaft, a pinned retaining collar mounted upon said stub shaft adjacent its outer end to secure said eccentric boss lever thereon, an eccentric cam lever and collar mounted upon the eccentric boss of first said lever, said last named collar having slots cut upon part of its peripheral face, means to prevent said last named collar from rotating when the eccentric boss upon which said last named collar is mounted is turned, a pawl pivoted upon the side of said eccentric cam lever, a rod connected to said pawl and to a pivoted hand grip mounted upon the lever of said eccentric cam whereby on movement of said hand grip and lever the pawl may be operated and caused to register with the slots in said last named collar to position said eccentric cam upon its bearing.

6. In an adjustable hose shut-off and clamp the combination comprising, a rectangular base plate, a bearing support on one side thereof, a stub shaft secured in said bearing support, means supporting the outer end of said stub shaft, an eccentric boss lever mounted upon said stub shaft, a pinned retaining collar mounted upon said stub shaft adjacent its outer end to secure said eccentric boss lever thereon, an eccentric cam lever and collar mounted upon the eccentric boss of first said lever, said last named collar having slots cut upon part of its peripheral face, means to prevent said last named collar from rotating when the eccentric boss upon which said last named collar is mounted is turned, said means comprising a pin secured in the side of said last named collar and positioned in a slot in the side of said base plate, a pawl mounted upon the side of said eccentric cam lever, a rod connected to said pawl and to a pivoted hand grip mounted upon the lever of said eccentric cam whereby on movement of said hand grip and lever the pawl may be operated and caused to register with the slots in said last named collar to position said eccentric cam upon its bearing.

In testimony whereof I affix my signature.

JOHN FYFE.